Jan. 23, 1934.  T. K. CUMMINS ET AL  1,944,546
HAND BRAKE MECHANISM
Filed Sept. 9, 1929  6 Sheets-Sheet 2
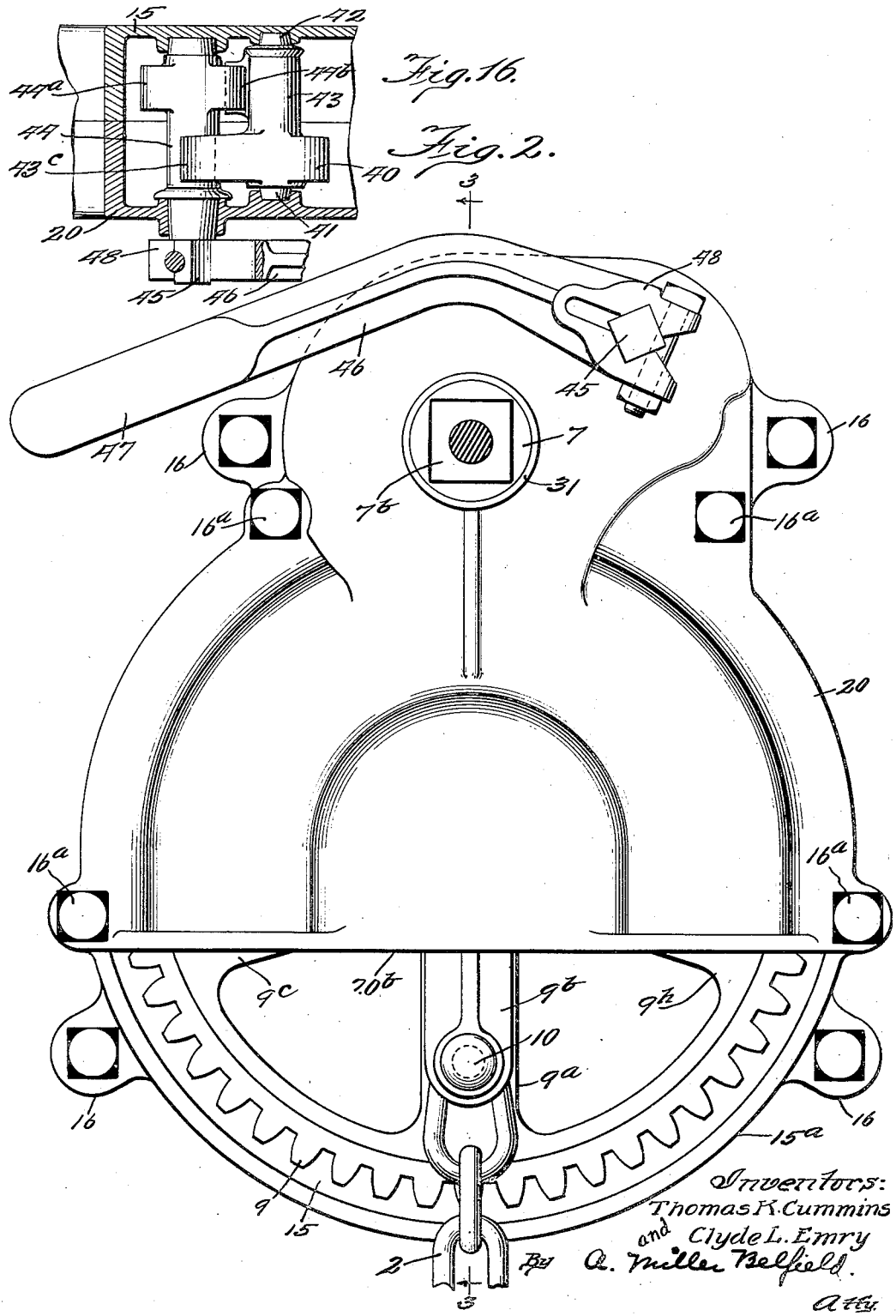

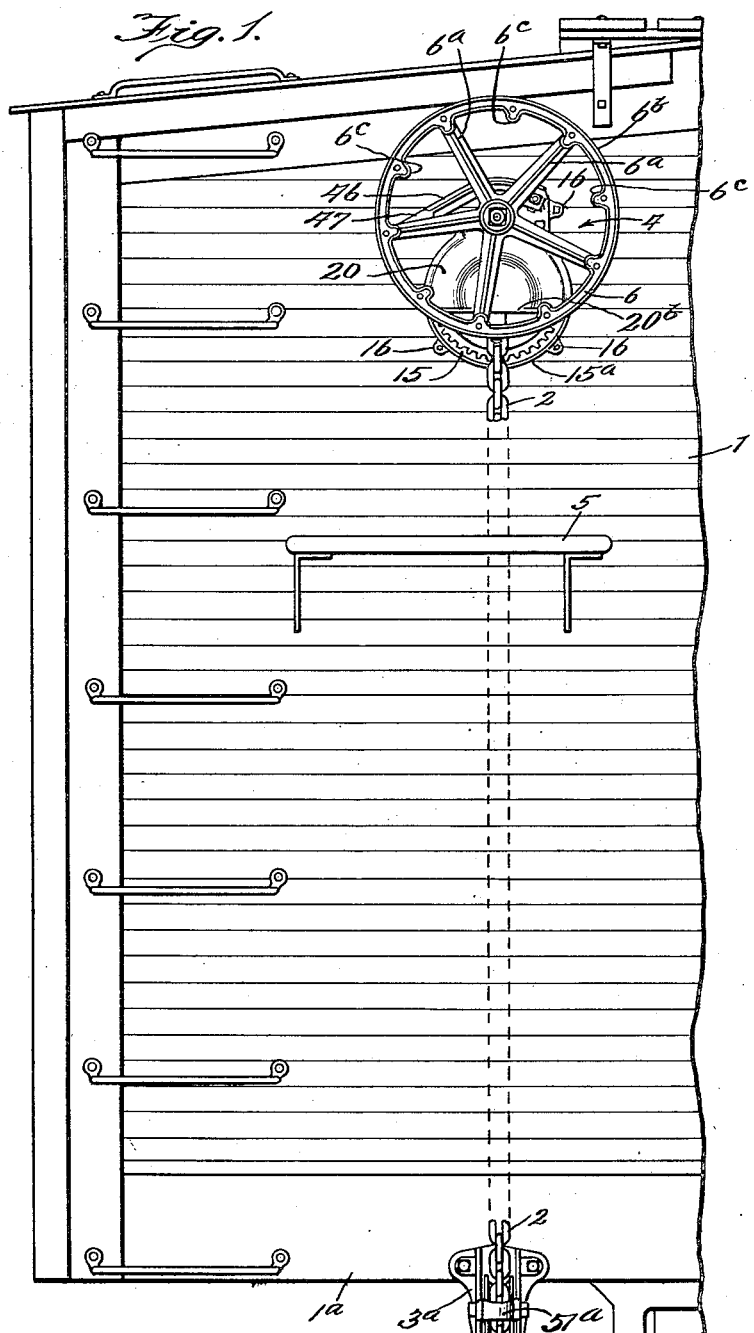

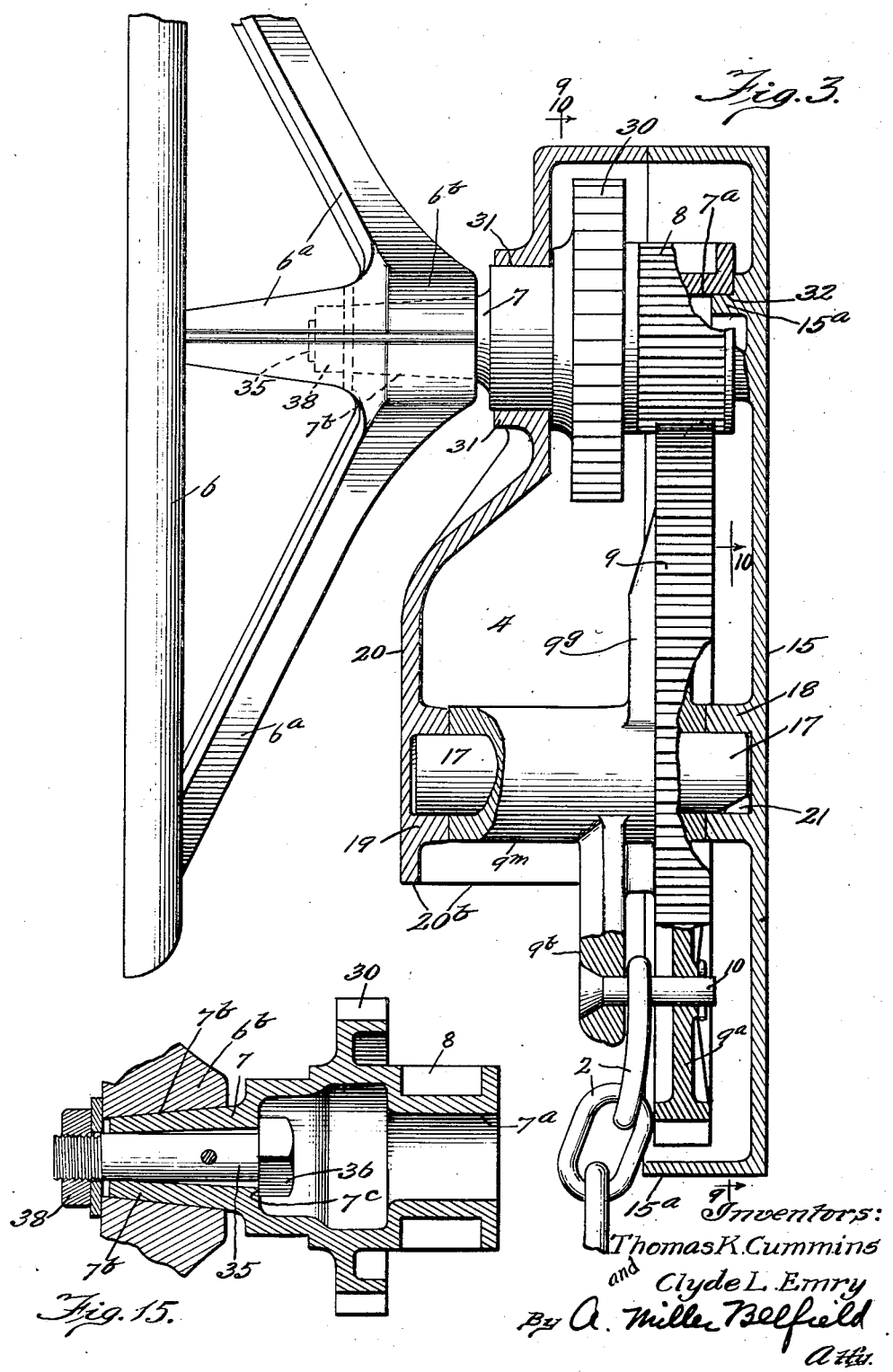

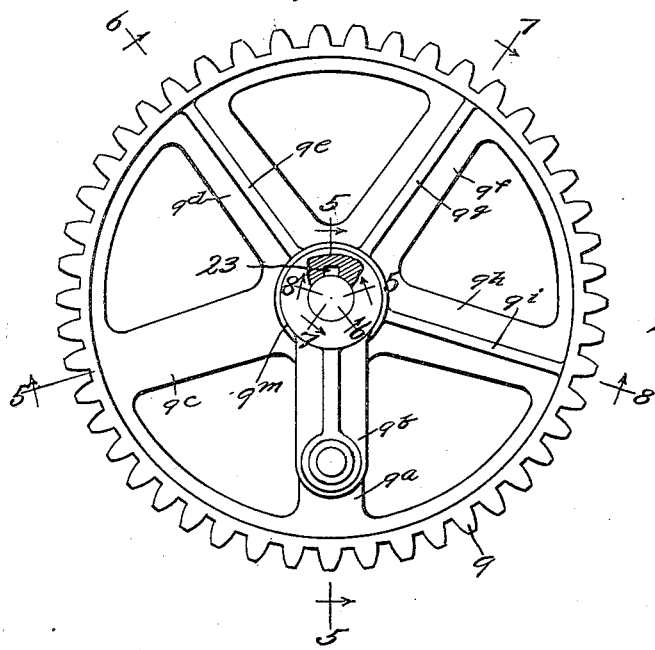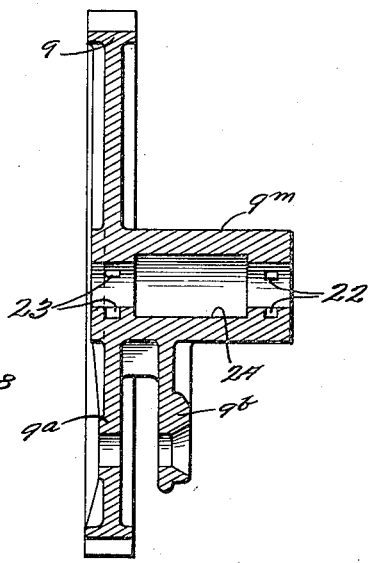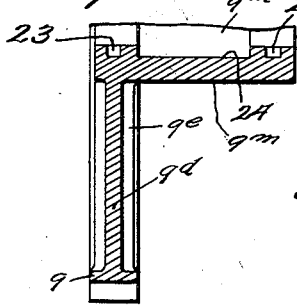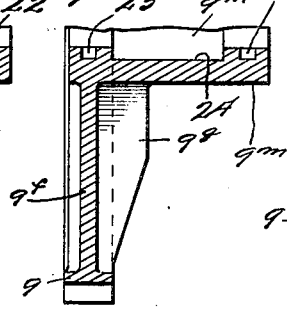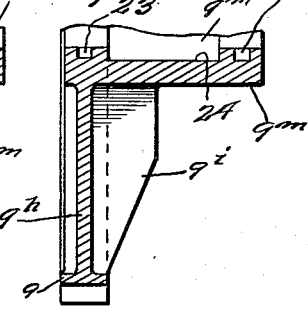

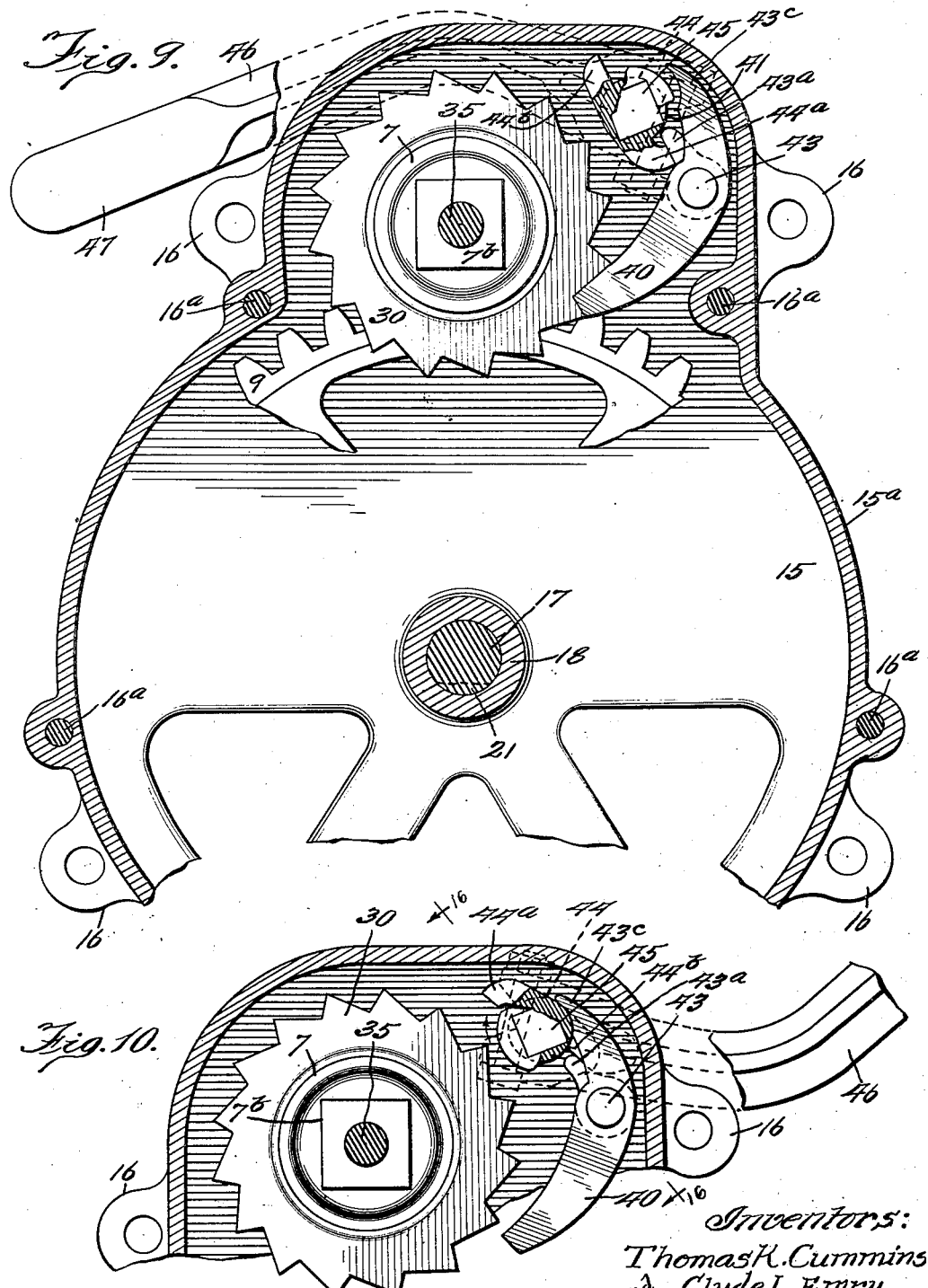

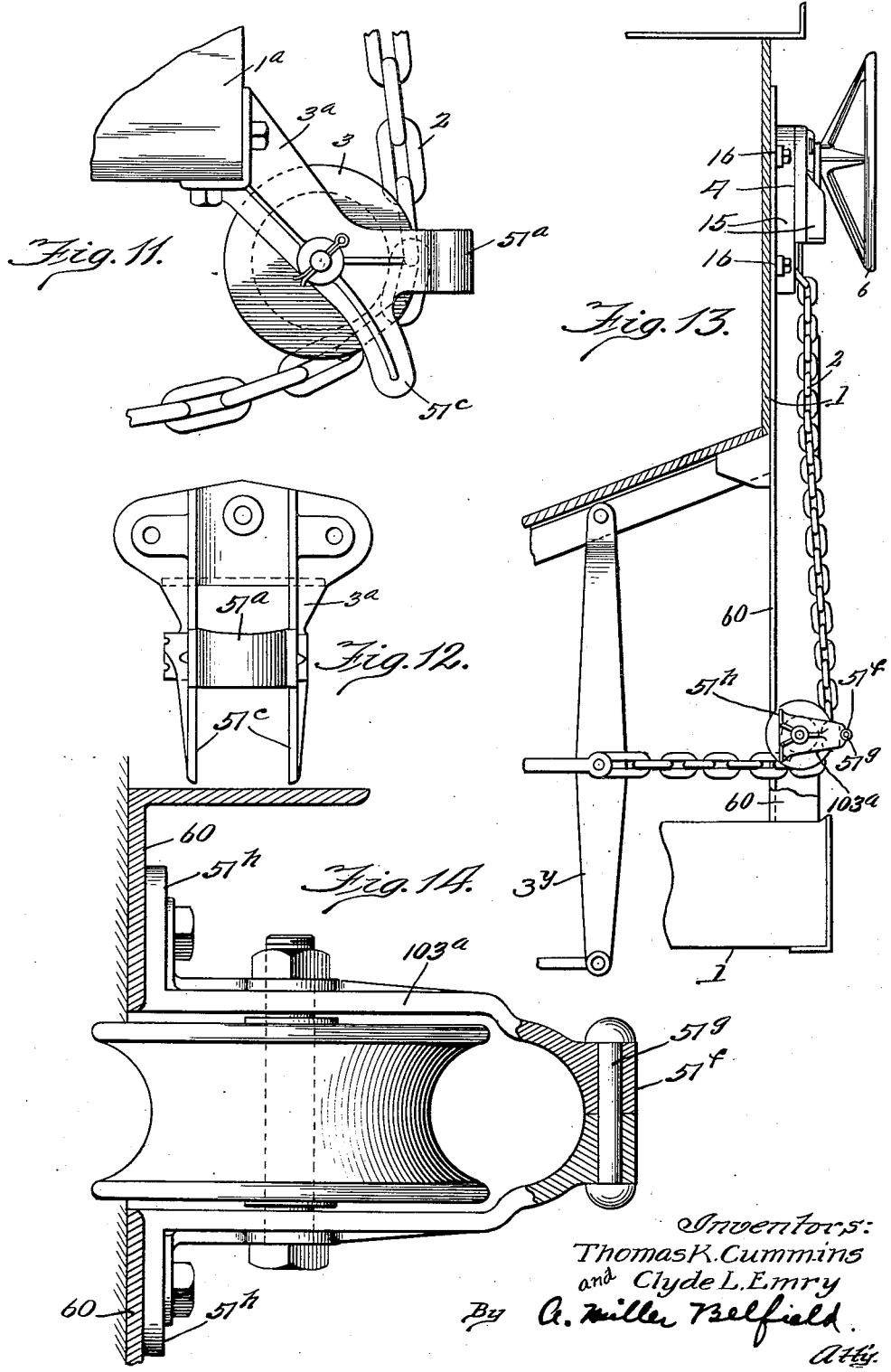

Patented Jan. 23, 1934

1,944,546

UNITED STATES PATENT OFFICE 1,944,546

HAND BRAKE MECHANISM

Thomas K. Cummins and Clyde L. Emry, St. Paul, Minn., assignors to Northern Malleable Iron Company, St. Paul, Minn., a corporation of Minnesota Application September 9, 1929. Serial No. 391,132

7 Claims. (Cl. 254—149)

This invention relates to hand brake mechanism for railway cars and particularly to means for manually operating brakes through the usual brake beam and the chain connection to a brake drum associated with this device.

One of the objects of the invention is to produce an improved brake setting mechanism of this character.

Another object of the invention is to produce an improved brake setting mechanism of simple and durable construction.

Another object of the invention is to produce an improved brake setting mechanism of such detailed construction that the slack of the chain may be quickly taken up and upon further rotation of the mechanism, great power may be applied to the brake shoes.

A further object of the invention is to provide means for preventing the chain from fouling or tangling in the release movement of the mechanism.

Another object of the invention is to provide specific detail of construction and novel arrangement of parts for carrying out the above and other objects which will appear in the following description, and which are pointed out in the claims.

In the drawings:—

Fig. 1 is an end view of a railway box car equipped with the invention.

Fig. 2 is an elevation of the drum and gear housing.

Fig. 3 is a section at the line 3—3 of Fig. 2.

Fig. 4 is a detail view in elevation of the winding drum and a gear for operating same integral therewith.

Fig. 5 is a section at the line 5—5 of Fig. 4.

Figs. 6, 7 and 8 are detail views taken at the lines 6, 7 and 8 respectively of Fig. 4 and show the contour of certain chain-guiding ribs formed on the spokes of the gear wheel.

Fig. 9 is a section at the line 9—9 of Fig. 3.

Fig. 10 is a view similar to Fig. 9, but with certain parts in changed position.

Fig. 11 is a detail side view of a guide sheave shown attached to the end sill of a car.

Fig. 12 is a front view of the sheave bracket shown in Fig. 11.

Fig. 13 is a side view of a guide sheave and bracket mounted on a gondola car.

Fig. 14 is a plan view of the bracket shown in Fig. 13, drawn to an enlarged scale.

Fig. 15 is a detail view of a combined pinion and ratchet wheel with parts in section to disclose certain features of construction.

Fig. 16 is a section at the line 16—16 of Fig. 10.

The drawings show a car 1, a chain 2 which leads upward from the brake beam lever over a guide sheave 3 mounted in a bracket $3^a$ on the car sill $1^a$ to the brake setting mechanism generally indicated at 4. The operator stands upon a platform 5 which is attached to the end wall of the car 1 and is conveniently located for operating the hand wheel 6 of the mechanism 4 which is also mounted on and secured to the end wall of the car a short distance down from the top thereof.

When it is desired to apply the brakes, the hand wheel 6 is operated to rotate the spindle 7 which has formed integral therewith a pinion 8; this pinion meshes with a gear 9 to which the chain 2 is secured as by a pin 10 at a considerable distance from the center of the gear 9. The pin 10 is mounted in position and secured in place by taking through a hole formed in one of the spokes as the spoke $9^a$ and through a hole in a radial arm $9^b$ which overhangs the spoke $9^a$.

The initial rotating of the gear 9 operates to quickly take up the slack in the chain, and a continued movement causes the chain to be wound about the drum $9^m$ and by virtue of the drum being of relatively small diameter, great power is exerted through the chain to the brake beam.

It is desirable that the chain be wound about the drum in a helical formation, so that the windings thereof will not climb and cause uncertain action of the device. To this end, means is provided to guide the chain as the drum is rotated. It will be noted that the spoke $9^a$ and the radial arm $9^b$ are spaced apart just sufficiently to accommodate the thickness of the chain and in the first winding thereof, the chain will lie on the drum in a position close to the spokes. The first two spokes $9^a$ and $9^c$, with respect to the direction of the movement in winding, are formed to permit the chain to occupy a plane coincident or parallel with the plane of rotation of the drum, but the next spoke, $9^d$, has a rib $9^e$ (see Fig. 6) arranged to start the chain in a helical path; the next spokes $9^f$ and $9^h$ have the ribs $9^g$ and $9^i$ arranged for further leading the chain to insure its lying directly on the periphery of the drum so that the maximum force may be exerted through the chain to the brake beam.

A housing for the various elements comprises a main housing member 15, which has the lugs 16—16 for holding the device in position and the bolts $16^a$—$16^a$ are for securing a cover member 20 in position; the various elements are journalled within these two members with a view to protect them from the weather, the journals are designed and arranged with means for storing a considerable amount of lubricant to the moving parts so journalled within the housing.

The gear 9 is mounted for rotation on a shaft 17 which has one end journalled at 18 in the housing member 15 and the cover member 20 carries a journal 19 for the other end of this shaft. This shaft is held against rotation by a key 21 formed at the bottom of the journal 18 as indicated in Fig. 3, and a notch cut away from the shaft at the end which occupies this journal; by this arrangement the wheel 9 is caused to rotate on the shaft, and the bearing in the wheel is extended throughout the entire length of the drum $9^m$, which is formed integral with the wheel, and the drum, so related, forms a hub of relatively great longitudinal extent so that the wearing of the parts is reduced to a minimum.

To lubricate this bearing, grease storage-pockets are formed by cutting the recesses 22 and 23 in the bore of the hub and enlarging the bore at 24 between these recesses; thus a sufficient quantity of grease (preferably containing graphite) may be stored to lubricate the bearing for a considerable time.

The gear 9 is rotated by the pinion 8 as previously stated; this pinion 8 with its spindle 7 has associated therewith a ratchet wheel 30 which is also formed integral with the spindle 7. The spindle 7 is journalled at 31 in the cover 20 and at 32 in the housing 15; it is made hollow for the storage of lubricant and the end $7^a$ is bored to fit the boss $15^a$ on the housing which constitutes the journal thereat and this boss forms a closure for the lubricant-containing recess in the spindle 7.

The end $7^b$ of the spindle protrudes through the cover member 20 and terminates in a rectangular tapered axle for receiving thereon the hub $6^b$ of the hand wheel 6; a bolt 35 with its head 36 engaging a shoulder $7^c$ in the bore of the spindle 7, together with the nut 38 retains the wheel 6 in proper position on the spindle 7.

The ratchet 30 has associated therewith a pawl 40 journalled at 41 and 42 in the housing 15 and the cover member 20 respectively. This pawl 40 is cast integral with a shaft 43 for so journalling it. Parallel with the shaft 43 is a shaft 44 (hollowed for lubricant) and likewise journalled, and has a squared end 45 protruding through the cover member 20 to which is secured a lever 46 having a weighted handle 47 at one end, and the other end 48 is arranged to fit over the squared protruding end 45 of the shaft 44.

When the device is operated to set the brakes, the pawl 40 is urged by the weighted end 47 to engage the teeth in the ratchet 30; the means through which this is accomplished consists of a projection $44^a$ on the shaft 44 engaging the under side of a projection $43^a$ on the shaft 43 (see Fig. 9); thus the turning tendency of the shaft 44 tends to turn the shaft 43 and thereby the pawl is ratcheted over the wheel 30 and caused to function by gravity.

For releasing the pawl 40, the lever 46 is lifted for rotating the shaft 44 until a second projection $44^b$ on the shaft engages the projection $43^a$ on the shaft 43, and swings the pawl 40 out of engagement. (See Fig. 10.)

It is desirable to release the pawl 40 from the teeth of the ratchet wheel 30 with minimum operation of the hand wheel 6 and the teeth are formed with this object in view. The pawl-engaging faces of these teeth are slightly inclined to the path of the pawl so that very slight power need be applied through the lever 46 to disengage the pawl from the teeth for reversing the rotation of the drum.

The amount of swing of the lever 46 is determined by a finger $43^c$ on the shaft 43 coming at rest in contact with the shaft 44 when the lever 46 is thrown back.

The contacting of this finger $43^c$ serves to hold the pawl and the operating lever 46 in a stable position, and prevents the parts from rattling, and thus avoids the wear due to vibration.

It will be noted that gravity, or the weight of the handle 47 is employed for controlling the action of the pawl when it is in or out of engagement.

The housing 15 has a guard-flange $15^a$ surrounding the gear 9, and is of sufficient extent to completely guard the operator against any accidental contact with the teeth of the gear. It is desirable to be able to inspect the chain connection at the pin 10 without removing or dismantling the device, and for this purpose the housing cover 20 is terminated at $20^b$ just below the shaft 17, thus forming a weather guard having an inspection opening.

The hand wheel 6 has a series of spokes $6^a$ sufficiently spaced apart to allow easily grasping the rim $6^b$. Lugs $6^c$ are interposed between the spokes 6 and project inwardly from the rim and assist in providing a safe grip of the hand wheel.

The chain 2 drops from the winding mechanism and runs over a sheave 3 in the bracket $3^a$ to the brake beam (not shown) but connected thereto through a lever $3^y$ and is held in position on the sheave by a guide $51^a$ formed on the bracket. When the brakes are in released position, the chain 2 is slack, and between the sheave 3 and the brake beam it hangs in somewhat of a cantenary curve and due to the swaying of the car the chain has a tendency to get out of proper alignment with respect to the sheave, and to guard against this the bracket shown in Figs. 11 and 12 has the guards $51^c$—$51^c$. The form of the bracket just described is more particularly adapted for use with box cars.

The form of bracket shown in Figs. 13 and 14 is available for use in gondola cars where the bracket $103^a$ being mounted on the angle irons 60—60, which may be a part of the car construction, needs only the guide $51^f$ since the angles 60 perform the funtion of the guards $51^c$ of the other form. The bracket in the form shown in Fig. 14 is preferably made in two parts and riveted or bolted together at $51^g$, while the foot flanges $51^h$—$51^h$ are bolted to the angle irons 60—60.

In both forms shown the brackets are made of open construction so that the chain may feed downward freely, without fouling, in contradistinction to any housing around or at the under side of the sheaves; herein is shown an open guide and side guards which insure that the chain will at all times be free to act.

It will be understood that changes and modifications may be made without departing from the spirit of the invention.

We claim:

1. In a brake controlling device of the character described, means for operating the same, said means including a gear and a drum formed integral therewith, a chain adapted to be wound round the drum, radial guide-ribs formed on the gear and associated with the drum, said guides projecting successively in varying degree away from the plane of the gear and along the drum.

2. In a brake controlling device of the character described including a housing, a gear and a drum mounted therein and means for operating the same; the mounting for the said gear and drum consisting of a shaft fixedly secured against rotation in the said housing, said securement for the shaft consisting of a key-lug formed in the housing and a notch in the shaft-end cooperating with the said lug.

3. In a brake controlling device of the character described, means for operating the same, said means including a drum, a gear integral therewith, radial ribs on the gear extending away therefrom and also projecting from the drum; a chain arranged to be wound on the drum, said ribs arranged to guide the said chain in helical formation around the said drum.

4. In a brake controlling device of the character described, means for operating the same, said means including a gear and a drum integral therewith, a chain arranged to be wound on the drum, guides in the form of radial ribs on the gear and projecting along the periphery of the drum in progressively greater extent therealong for guiding the said chain in helical formation when wound on the said drum.

5. In a brake controlling device of the character described including a housing, a gear and a drum mounted therein and means for operating the same; the mounting for the said gear and drum consists of a shaft, hollow bosses closed at the outer ends for supporting the said shaft, an angular lug formed in the hollow of one of the said bosses and an angular face formed on one end of the said shaft, said angular lug and said angular face co-operating to prevent rotation of the shaft in its supports.

6. In a brake controlling device of the character described, means for operating the same, said means including a drum, a gear attached thereto, a chain arranged to be wound on the drum, and radial ribs extending in the path of the chain and arranged to guide the chain in helical formation around the drum.

7. In a brake controlling device of the character described, means for operating the same, said means including a unitary gear and a drum, a chain arranged to be wound on the drum, and radial ribs in progressively greater extent positioned in the path of the chain for guiding said chain in helical formation around the drum.

THOMAS K. CUMMINS.
CLYDE L. EMRY.